US009009128B2

(12) United States Patent
Goto

(10) Patent No.: US 9,009,128 B2
(45) Date of Patent: Apr. 14, 2015

(54) INFORMATION PROCESSING APPARATUS, INFORMATION PROCESSING METHOD AND PROGRAM

(75) Inventor: Koichi Goto, Kanagawa (JP)

(73) Assignee: Sony Corporation, Tokyo (JP)

( * ) Notice: Subject to any disclaimer, the term of this patent is extended or adjusted under 35 U.S.C. 154(b) by 109 days.

(21) Appl. No.: 12/899,724

(22) Filed: Oct. 7, 2010

(65) Prior Publication Data

US 2011/0093447 A1 Apr. 21, 2011

(30) Foreign Application Priority Data

Oct. 16, 2009 (JP) ................................ P2009-239150

(51) Int. Cl.
*G06F 17/30* (2006.01)
(52) U.S. Cl.
CPC ................................ *G06F 17/30058* (2013.01)
(58) Field of Classification Search
USPC ........................................................ 707/706
See application file for complete search history.

(56) References Cited

U.S. PATENT DOCUMENTS

2003/0229679 A1* 12/2003 Yoo et al. ...................... 709/217
2006/0276124 A1* 12/2006 Kikkoji et al. ............... 455/3.01
2007/0177466 A1*  8/2007 Ando et al. ................. 369/13.01
2007/0188519 A1*  8/2007 Kii et al. ....................... 345/619

FOREIGN PATENT DOCUMENTS

| JP | 2001-203908 | 7/2001 |
| JP | 2004-336310 | 11/2004 |
| JP | 2007-158591 | 6/2007 |
| JP | 2008-113116 | 5/2008 |
| JP | 2008-118469 | 5/2008 |
| JP | 2008-113195 | 6/2008 |
| JP | 2008-135985 | 6/2008 |
| JP | 2008-159139 | 7/2008 |

* cited by examiner

*Primary Examiner* — Hosain Alam
*Assistant Examiner* — Johnese Johnson
(74) *Attorney, Agent, or Firm* — Finnegan, Henderson, Farabow, Garrett & Dunner, L.L.P.

(57) ABSTRACT

An information processing apparatus including a search unit configured to access a server storing a plurality of contents therein, and search for a desired content from among the plurality of contents, a recognition unit configured to recognize a reproduction apparatus which is capable of reproducing a content stored in the server, an instruction unit configured to instruct the reproduction apparatus to reproduce the content having been searched for by the search unit, and an acquisition unit configured to acquire reproduction information relating to the content having been reproduced by the reproduction apparatus.

15 Claims, 11 Drawing Sheets

| DEVICE NO. | SERIAL NO. | Mac ADDRESS | PRODUCT NAME |
|---|---|---|---|
| DEVICE 1 | xxxxx | aaaaa | HAND HELD |
| DEVICE 2 | yyyyy | bbbbb | TV1 |
| DEVICE 3 | zzzzz | ccccc | TV2 |
| DEVICE 4 | ppppp | ddddd | BDP |

| PROFILE | RESOLUTION | AVC PROFILE | Avg Bit rate | Peak Bit rate |
|---|---|---|---|---|
| PT (LOW) | 720 × 480 @ 23.976p, 29.97p, OR 29.97i<br>720 × 576 @ 25p, OR 25i | MAIN @ L3.0 | 1 Mbps | 3 Mbps |
| SD (MEDIUM) | 720 × 480 @ 23.976p, 29.97p, OR 29.97i<br>720 × 576 @ 25p, OR 25i | MAIN @ L3.0 | 1.5 Mbps | 5 Mbps |
| HD (HIGH) | 1440 × 1080 @ 29.97i, OR 25i<br>1920 × 1080 @ 29.97i, OR 25i<br>1280 × 720 @ 23.976p, 50p, OR 59.94i<br>1440 × 1080 @ 23.976p<br>1920 × 1080 @ 23.976p | MAIN @ L4.0 OR HIGH @ 4.0 | 5 Mbps | 15 Mbps |

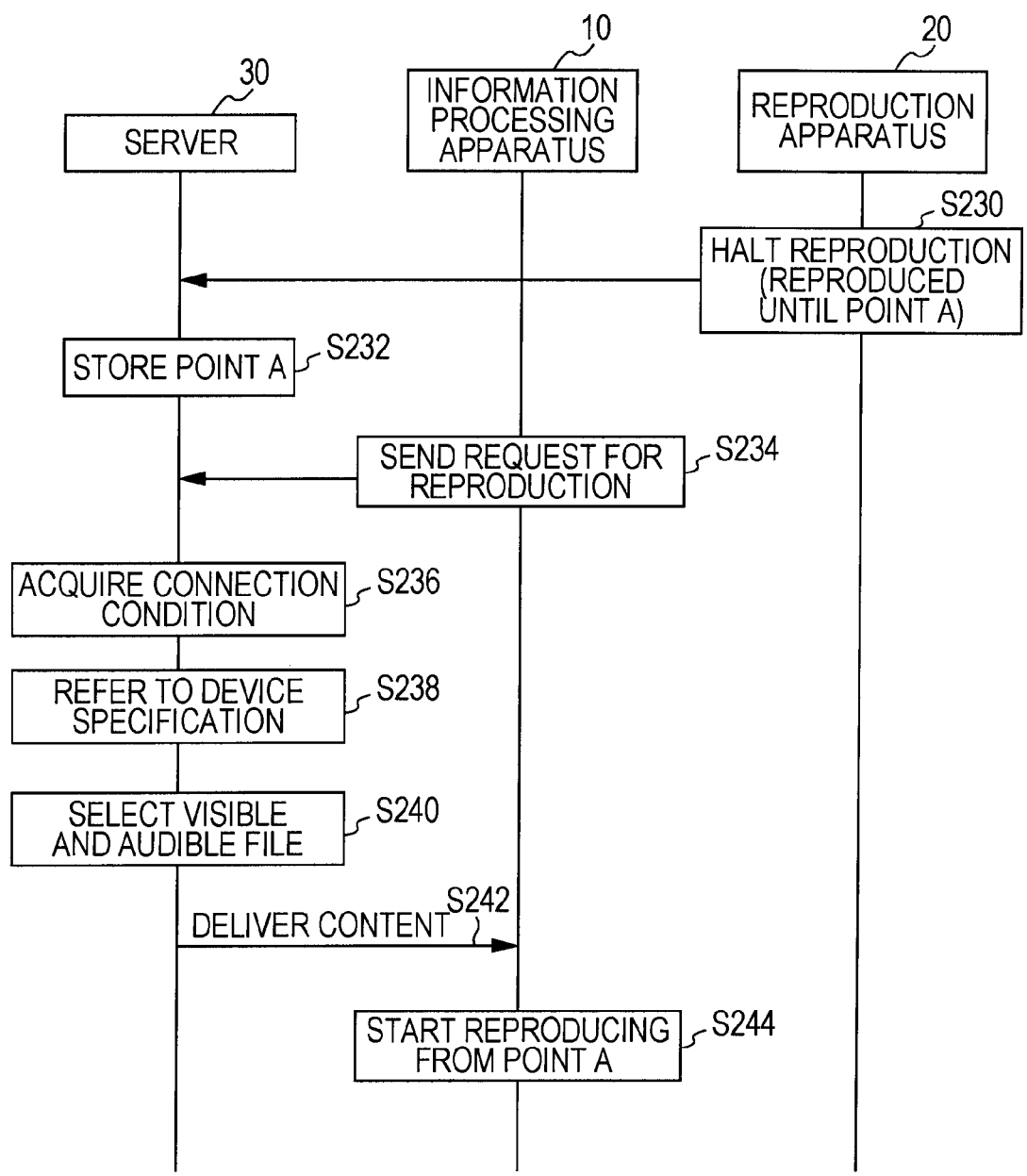

INFORMATION PROCESSING APPARATUS, INFORMATION PROCESSING METHOD AND PROGRAM

BACKGROUND OF THE INVENTION

1. Field of the Invention

The present invention relates to information processing apparatuses, information processing methods and programs, and in particular, it relates to an information processing apparatus, an information processing method and a program, which access a server for contents, instruct reproduction apparatuses to reproduce contents, and the like.

2. Description of the Related Art

To date, display apparatuses each having a large display screen therein, such as digital broadcast receivers, have become large in size, and by using a small apparatus having a display therein, which is provided separately from such a display apparatus, selection of programs and reservation of recording programs have been made (for example, refer to Japanese Unexamined Patent Application Publication No. 2001-203908). In Japanese Unexamined Patent Application Publication No. 2001-203908, a display apparatus itself having a large screen therein and a small auxiliary input apparatus are connected to each other via a wireless link, and the auxiliary input apparatus is configured to include a touch panel mounted on a display thereof. Providing such a configuration makes it unnecessary for users to perform operations on the display of the large screen, and makes it possible for users to, by using the touch panel on the display of the small auxiliary input apparatus, perform selection operations and the like.

SUMMARY OF THE INVENTION

At the same time, recently, content delivery services, which allow videos, pieces of music and pieces of software to be delivered to devices inside houses via networks, have been in widespread use. Therefore, merely providing a method, which allows users to perform auxiliary input operations using a small apparatus, which is provided separately from the large display just like that such as shown in Japanese Unexamined Patent Application Publication No. 2001-203908, causes a limitation in enhancement of conveniences for operations performed by users.

Accordingly, it is desirable to provide an information processing apparatus, an information processing method and a program, which are newly created and improved so that enhancement of conveniences for operations performed by users can be achieved in reproduction of contents via networks.

According to an embodiment of the present invention, an information processing apparatus, which includes a search unit configured to access a server storing a plurality of contents therein, and search for a desired content from among the plurality of contents, a recognition unit configured to recognize a reproduction apparatus which is capable of reproducing a content stored in the server, an instruction unit configured to instruct the reproduction apparatus to reproduce the content having been searched for by the search unit, and an acquisition unit configured to acquire reproduction information relating to the content having been reproduced by the reproduction apparatus, is provided.

Further, the information processing apparatus may include a reproduction unit configured to reproduce a content on the basis of the reproduction information having been acquired by the acquisition unit.

Further, the reproduction information may include reproduction start information indicating a reproduction start point of the content having been reproduced by the reproduction apparatus, and the reproduction unit may reproduce the content from the reproduction start point indicated by the reproduction start information.

Further, the server may be configured to, upon receipt of a request from the reproduction unit for reproduction of the content having been reproduced by the reproduction apparatus, deliver the content from the reproduction start point of the content on the basis of the reproduction start information.

Further, the server may be configured to, upon receipt of a request from the reproduction unit for reproduction of the content having been reproduced by the reproduction apparatus, transmit the reproduction start information in addition to the content.

Further, the reproduction apparatus, having been instructed to reproduce the content by the instruction unit, may request the server to reproduce the content.

Further, the server may be configured to, upon receipt of a request from the reproduction unit for reproduction of the content having been reproduced by the reproduction apparatus, deliver a content having a file size appropriate to a performance and a connection condition of the information processing apparatus.

Further, according to an embodiment of the present invention, an information processing method, which includes the steps of accessing a server storing a plurality of contents therein, and searching for a desired content from among the plurality of contents, recognizing a reproduction apparatus which is capable of reproducing a content stored in the server, instructing the reproduction apparatus to reproduce the content having been searched for, and acquiring reproduction information relating to the content having been reproduced by the reproduction apparatus, is provided.

Further, according to an embodiment of the present invention, a program, which causes a computer to function as an information processing apparatus including a search unit configured to access a server storing a plurality of contents therein, and search for a desired content from among the plurality of contents, a recognition unit configured to recognize a reproduction apparatus which is capable of reproducing a content stored in the server, an instruction unit configured to instruct the reproduction apparatus to reproduce the content having been searched for by the search unit, and an acquisition unit configured to acquire reproduction information relating to the content having been reproduced by the reproduction apparatus, is provided.

As described above, according to an embodiment of the present invention, it is possible to enhance conveniences for operations performed by users in reproduction of contents via networks.

BRIEF DESCRIPTION OF THE DRAWINGS

FIG. 4 is a diagram used for explanation of device information stored in a management file according to a first embodiment of the present invention;

FIG. 9 is a diagram used for explanation of a file size of a content stored in a server according to a second embodiment of the present invention;

FIG. 11 is a timing chart illustrating details of content reproduction processing according to a second embodiment of the present invention.

DESCRIPTION OF THE PREFERRED EMBODIMENTS

Figure 1:
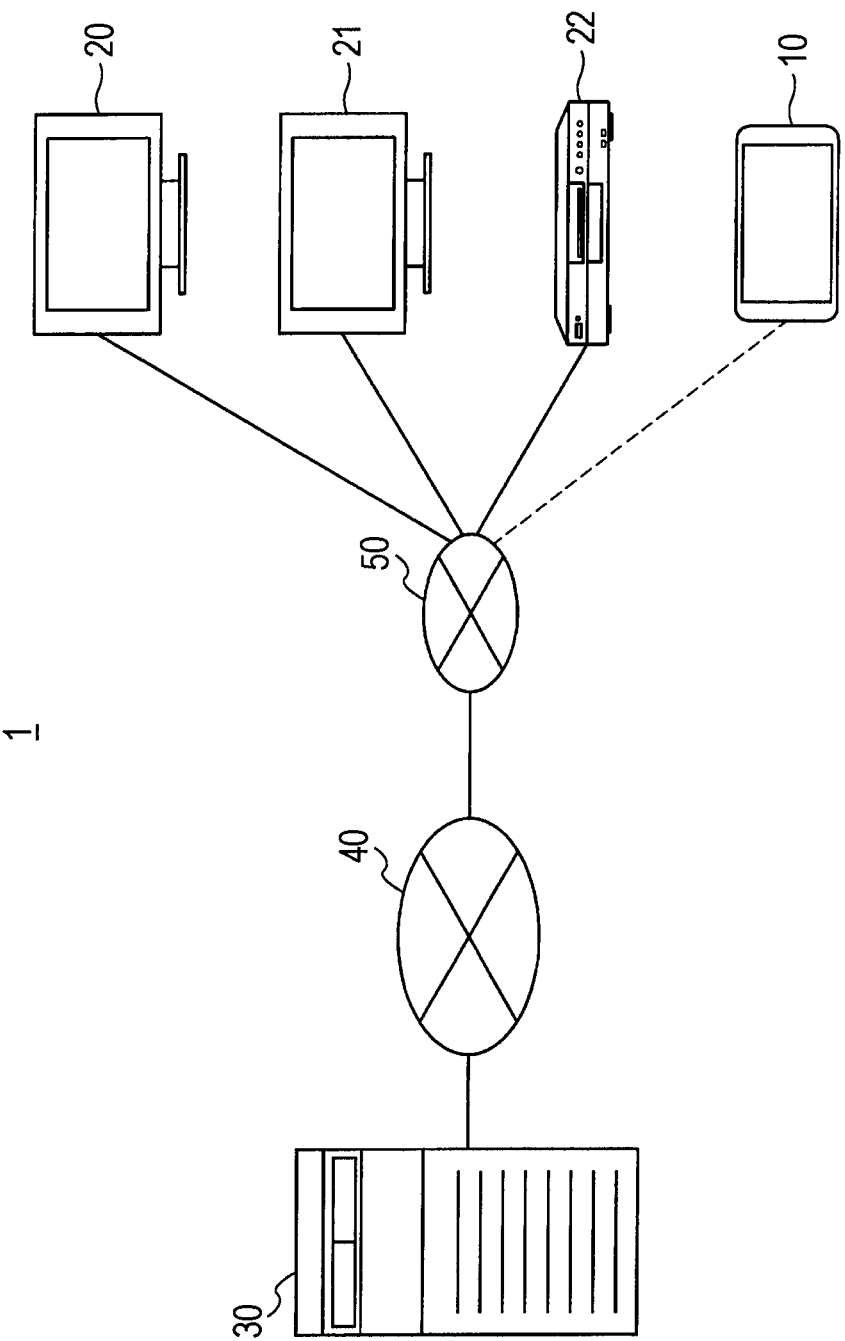
FIG. 1 is a diagram used for explanation of an outline of a content reproduction system according to an embodiment of the present invention.

Hereinafter, preferred embodiments according to the present invention will be described in detail with reference to accompanying drawings. In addition, in this patent specification document and accompanying drawings, by denoting configuration elements having substantially the same function by the same reference numeral, overlapping explanations are omitted.

Further, in accordance with an order described below, "the preferred embodiments" will be described.

[1] Purpose of preferred embodiments
[2] Outline of content reproduction system
[3] Hardware configuration of information processing apparatus
[4] First embodiment
[4-1] Function configuration of information processing apparatus
[4-2] Details of content reproduction processing in content reproduction system
[5] Second embodiment
[5-1] Function configuration of information processing apparatus
[5-2] Details of content reproduction processing in content reproduction system

[1] Purpose of Preferred Embodiment

Firstly, the purpose of preferred embodiments will be described hereinafter. To date, display apparatuses each having a large display screen therein, such as digital broadcast receivers, have become large in size, and by using a small apparatus having a display therein, which is provided separately from such a display apparatus, selection of programs and reservation of recording programs have been made. For example, in this case, a display apparatus itself having a large screen therein and a small auxiliary input apparatus are connected to each other via a wireless link, and the auxiliary input apparatus is configured to include a touch panel mounted on a display thereof. Providing such a configuration makes it unnecessary for users to perform operations on the display of the large screen, and makes it possible for users to, by using the touch panel on the display of the small auxiliary input apparatus, perform selection operations and the like.

At the same time, recently, content delivery services, which allow videos, pieces of music and pieces of software to be delivered to devices inside houses via networks, have been in widespread use. Therefore, merely providing a method, which allows users to perform auxiliary input operations using a small apparatus, which is provided separately from the large display just like that such as shown in Japanese Unexamined Patent Application Publication No. 2001-203908, causes a limitation in enhancement of conveniences for operations performed by users.

Accordingly, from a viewpoint aimed at such a circumstance as described above, inventors have reached a creation of a content reproduction system 1 according to an embodiment of the present invention. The content reproduction system 1 according this embodiment enables enhancement of conveniences for operations performed by users in reproduction of contents via networks.

[2] Outline of Content Reproduction System

Next, an outline of the content reproduction system 1 will be described below with reference to FIG. 1. FIG. 1 is a diagram illustrating an outline of the content reproduction system 1. As shown in FIG. 1, the content reproduction system 1 is configured to include an information processing apparatus 10, reproduction apparatuses 20, 21 and 22 (hereinafter, sometimes, these reproduction apparatuses 20, 21 and 22 will be called reproduction apparatuses 20), and a server 30.

The information processing apparatus 10 is an apparatus which is capable of reproducing portable contents, and as an examples thereof, a portable audio player, a portable game playing device, a mobile-phone, a personal digital assistant (PDA) and a compact personal computer (PC) can be provided. The information processing apparatus 10 is connected to the server 30 via a network 40. The network 40 is a communication network, via which the information processing apparatus 10 and the server 30 are connected so as to be able to communicate with each other. Further, the network 40 is configured by a public network, such as the Internet, a telephone network and a satellite communication network, a dedicated network, such as a WAN, a LAN and an IP-VPN, and the like, and may be configured by a fixed-line network or a wireless network.

Moreover, the information processing apparatus 10 is connected to the reproduction apparatuses 20 via a network 50, which is located inside a building, such as a house. The network 50 is configured by a dedicated network, such as a LAN, and may be configured by a fixed-line network or a wireless network.

The reproduction apparatuses 20 are apparatuses each being capable of reproducing contents, and as an example thereof, a television receiver incorporating a large display therein, a video processing apparatus for a home use (for example, a DVD recorder and a video deck) and the like can be provided. As described above, each of the reproduction apparatuses 20 is capable of transmitting and receiving data to/from the information processing apparatus 10 via the network 50. Further, each of the reproduction apparatuses 20 is also capable of accessing the server 30 via the network 40.

The server 30 is an information processing apparatus which is connected to the information processing apparatus 10 and the reproduction apparatuses 20 via networks, and transmits and receives data theretofrom. The server 30 stores a plurality of contents therein, and delivers contents in accordance with requests from the information processing apparatus 10 and the reproduction apparatuses 20. Further, the server 30 stores therein identification information relating to individual users and another identification information relating to devices owned by users, both of the identification information being associated with each other. Upon receipt of a request for a content from the information processing apparatus 10 or one of the reproduction apparatuses 20, the server 30 performs authentication of the requesting apparatus by using the user identification information and the device identification information, and delivers the content to the requesting apparatus if the authentication has been successfully completed.

Further, in the case where contents stored in the server 30 are encrypted by using a digital rights management (DRM) function and the like, encryption keys for decrypting the contents may be shared by devices owned by a user.

In this embodiment, a user accesses the server 30 or searches for a desired content from contents stored in the server 30 by operating the information processing apparatus 10. Further, in accordance with operations performed by the user, the information processing apparatus 10 transmits an instruction of reproducing the content to one the reproduction apparatuses 20. Upon receipt of the instruction of reproducing the content, which has been transmitted by the information processing apparatus 10, the reproduction apparatus 20 accesses the server 30, and requests the server 30 to reproduce the content. Upon receipt of the request from the reproduction apparatus 20 for reproduction of the content, the server 30 performs authentication of the requesting reproduction apparatus 20 on the basis of the user identification information, the device identification information and the like, and immediately after a successful completion of the authentication, the server 30 transmits a uniform resource locator (URL) and the like, which is necessary for delivery of the content to the requesting reproduction apparatus 20.

Such a method as described above makes it possible to cause the reproduction apparatus 20 having a large screen display and the like therein not to execute a troublesome process of searching for contents and the like, but cause the small portable information processing apparatus 10 to execute the troublesome process of searching for contents and the like. Therefore, such a method as described above makes it possible for users to, when performing operations other than an operation of reproducing contents, such as an operation of searching for contents and the like, use the handy information processing apparatus 10, further, only when performing the operation of reproducing contents, use the reproduction apparatus 20 having a large display therein, and thus, enables removal of an obstacle which interferes with users' watching and listening of contents using the reproduction apparatus 20.

Further, in the case where watching and listening of a content has been completed until an intermediate point of the content by using the reproduction apparatus 20, a piece of reproduction start information, which indicates until which point of the content reproduction thereof has been completed, is stored in the server 30. Therefore, when attempting to resume reproduction of a content from the intermediate point thereof, until which watching and listening thereof was previously completed, by using the information processing apparatus 10 or the reproduction apparatus 20, it is possible for users to watch and listen to a portion of the content, starting from the intermediate point thereof, until which watching and listening thereof was previously completed, on the basis of the piece of reproduction start information stored in the server 30. Such a method as described above enables devices owned by each user to share the reproduction start information, and thus, enables enhancement of conveniences for operations performed by users in reproduction of contents.

[3] Hardware Configuration of Information Processing apparatus

Figure 2:
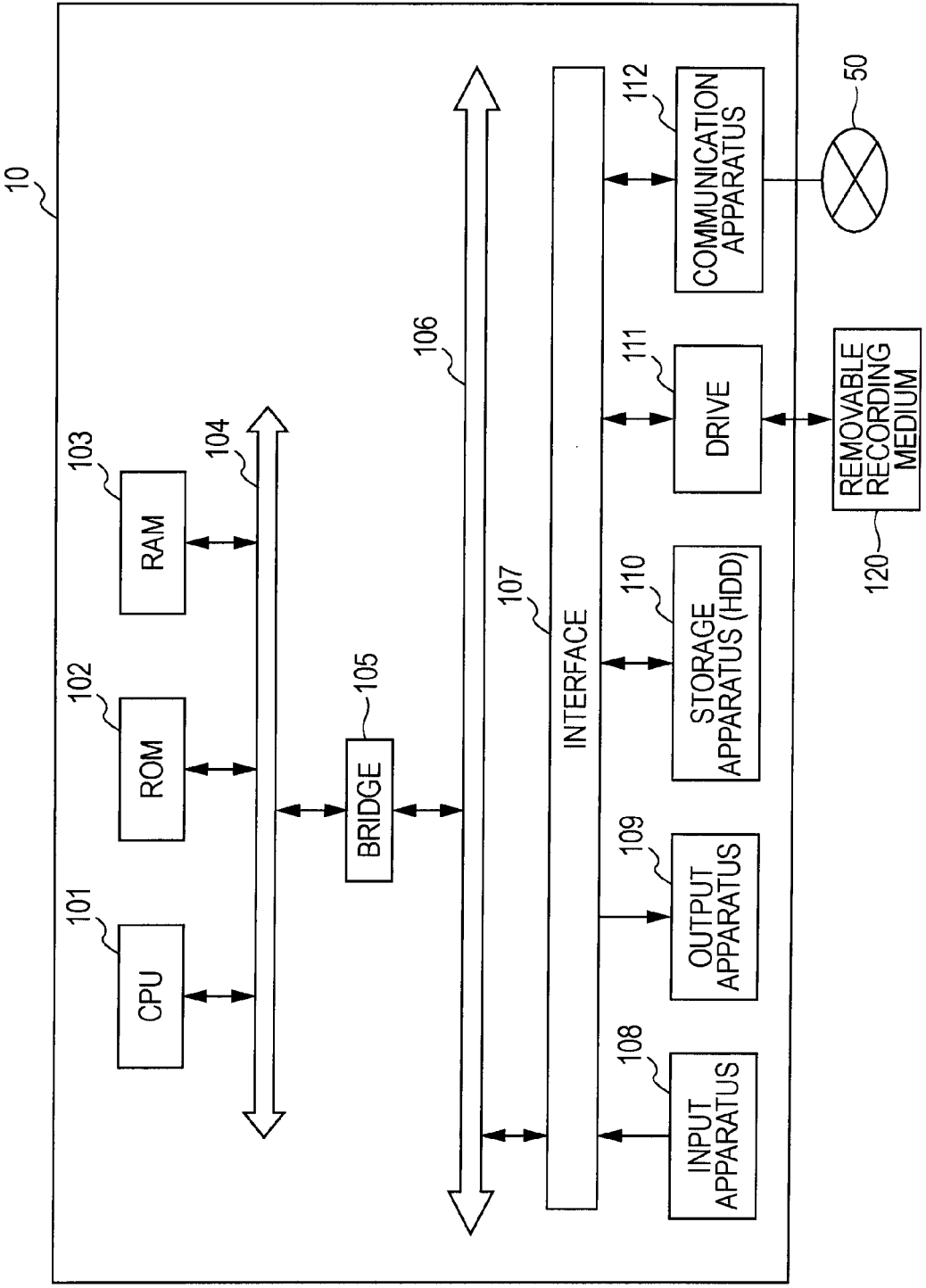
FIG. 2 is a block diagram illustrating a hardware configuration of an information processing apparatus according to an embodiment of the present invention.

Hereinbefore, an outline of the content reproduction system 1 has been described. Next, a hardware configuration of the information processing apparatus 10 will be described below with reference to FIG. 2. FIG. 2 is a block diagram illustrating a hardware configuration of the information processing apparatus 10. In addition, hardware configurations of the reproduction apparatus 20 and the server 30 are the same as or similar to that of the information processing apparatus 10, and therefore, here, only a hardware configuration of the information processing apparatus 10 will be described below.

As shown in FIG. 2, the information processing apparatus 10 is configured to include a central processing unit (CPU) 101, a read only memory (ROM) 102, a random access memory (RAM) 103, a host bus 104, a bridge 105, an external bus 106, an interface 107, an input apparatus 108, an output apparatus 109, a storage apparatus (HDD) 110, a drive 111, and a communication apparatus 112.

The CPU 101 functions as an arithmetic processing apparatus and a control apparatus, and performs control of overall operations performed inside the information processing apparatus 10 in accordance with various kinds of programs. Further, the CPU 101 may be a microprocessor. The ROM 102 stores programs and arithmetic parameters and the like therein. The RAM temporarily stores therein programs that are used for executions performed by the CPU 101, parameters that are appropriately changed during executions of the programs, and the like. Theses elements are connected to one another via the bus 104 that is configured by a CPU bus and the like.

The host bus 104 is connected to the external bus 106, such as a peripheral component interconnect/interface (PCI) bus. In addition, it is not necessary to separately configure the host bus 104, the bridge 105 and the external bus 106, but functions fulfilled by these buses may be integrated into one bus.

The input apparatus 108 is configured to include an input unit allowing users to input pieces of information, such as a mouse device, a key board, a touch panel, a button, a microphone, a switch and a lever, further, an input control circuit for generating input signals on the basis of the pieces of information inputted by users, and outputting the generated input signals to the CPU 101, and the like. It is possible for users of the information processing processor 10 to, by operating the input apparatus 108, input various kinds of data to the information processing apparatus 10, and instruct the information processing apparatus 10 to perform various operation processes.

The output apparatus 109 is configured by a display apparatus, such as a cathode ray tube (CRT) display apparatus, a liquid crystal display (LCD) apparatus, an organic light emitting display (OLED) apparatus or lamps, and an audio signal output apparatus, such as a speaker or a headphone. The output apparatus 109 outputs, for example, reproduced contents. More specifically, the display apparatus displays various kinds of information, such as reproduced video data, in the form of texts and/or images. Further, the audio signal output apparatus outputs audio signals resulting from conversion of reproduced audio data and the like.

The storage apparatus 110 is an apparatus for storing data therein, which is configured as an example of a storage unit included in the information processing apparatus 10 according to this embodiment, and is configured to be capable of including a storage medium, a recording apparatus for recording data into the storage medium, a reading-out apparatus for reading out data from the storage medium and a deleting apparatus for deleting data recorded in the storage medium. This storage apparatus 110 is configured by, for example, a hard disk drive (HDD). This storage apparatus 110 is configured to, by driving a hard disk, store programs to be executed by the CPU 101 and various kinds of data to be processed by the CPU. Further, this storage apparatus 110 stores therein items, identification numbers, which will be described below, and the like.

The drive 111 is a reader/writer for reading and writing data from/into the storage medium, and is incorporated in the information processing apparatus 10 or is externally attached to the information processing apparatus 10. The drive 111 reads out information that is stored in a magnetic disk, an optical disk, or a magnet-optical disk, which is loaded inside the drive 111 itself, or a removable storage medium 120, such as a semiconductor memory, and then, outputs the read-out data to the RAM 103.

The communication apparatus 112 is a communication interface that is configured by, for example, a communication device used for connection to the communication network 50, and the like. Further, the communication apparatus 112 may be a communication apparatus supporting a wireless local area network (LAN), a communication apparatus supporting a wireless USB, or a wired communication apparatus that performs communication via a wired communication link. Hereinbefore, an example of a hardware configuration of the information processing apparatus 10 has been described.

[4] First embodiment

Next, a first embodiment according to the present invention will be described below with reference to FIGS. 3 to 7. In this first embodiment, in accordance with an instruction issued by the information processing apparatus 10, the reproduction apparatus 20 accesses the server 30 to reproduce a content. Further, in the case where reproduction of a content was previously completed until an intermediate point thereof by using the reproduction apparatus 20, and at a next time, reproduction of the content is attempted by using the information processing apparatus 10 or the reproduction apparatus 20, it is possible to reproduce a portion of the content starting from the intermediate point thereof, until which watching and listening thereof was previously completed. Such a method as described above makes it possible for users to perform an operation of searching for contents and the like by using the small information processing apparatus 10, and perform an operation of reproducing contents by using the reproduction apparatus 20 having a large display therein in accordance with an instruction issued by the information processing apparatus 10. Further, reproduction information relating to each content, such as a reproduction start point, can be shared between the information processing apparatus 10 and the reproduction apparatuses 20.

[4-1] Function Configuration of Information Processing Apparatus

Figure 3:
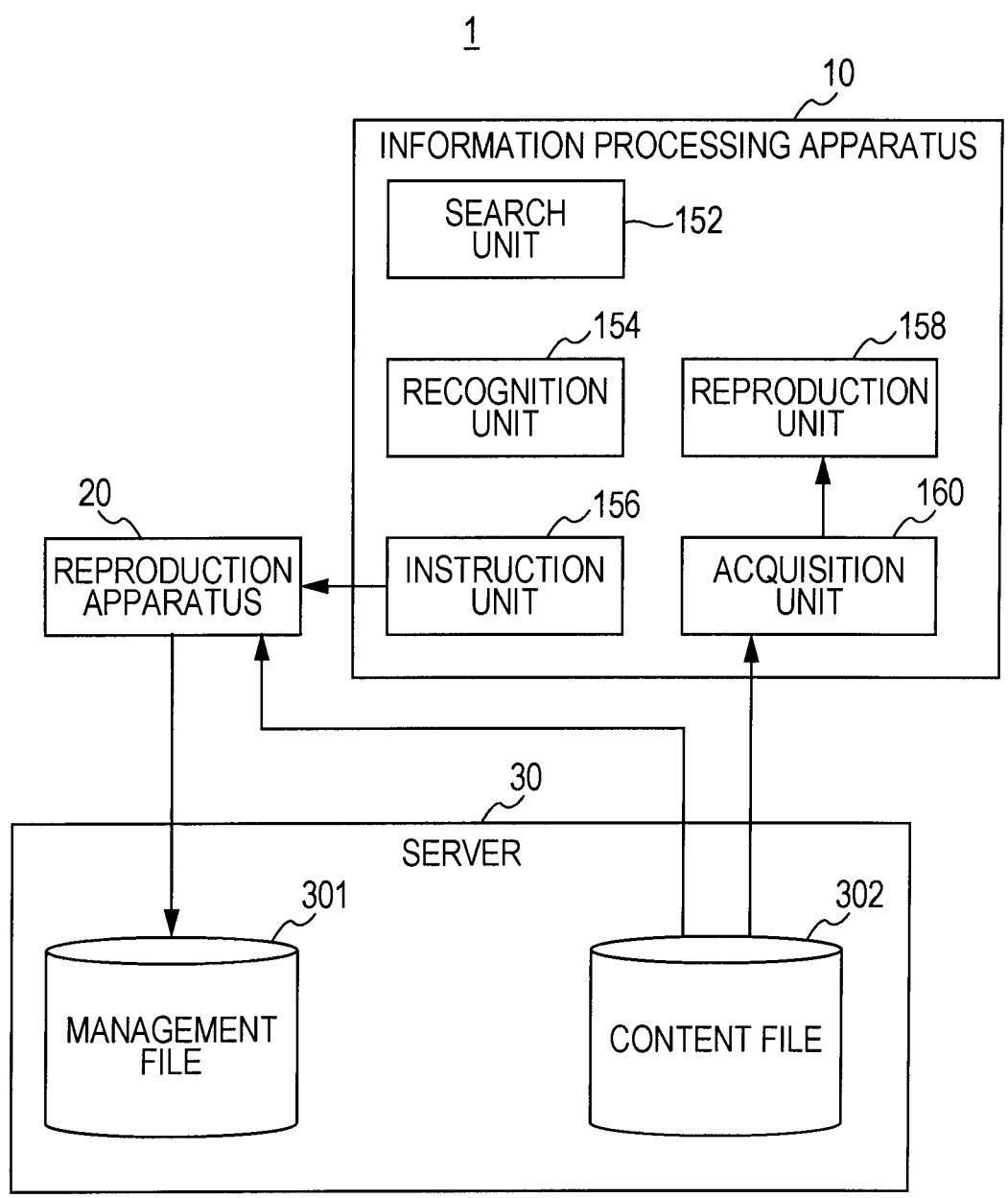
FIG. 3 is a block diagram illustrating a function configuration of a content reproduction system according to a first embodiment of the present invention.

Next, a function configuration of the content reproduction system 1 according to the first embodiment will be described below with reference to FIG. 3. In FIG. 3, the information processing apparatus 10, which is a characteristic apparatus in the first embodiment, will be described below particularly in detail. As shown in FIG. 3, the information processing apparatus 10 is configured to include a search unit 152, a recognition unit 154, an instruction unit 156, a reproduction unit 158 and an acquisition unit 160.

The search unit 152 has a function of accessing the server 30, which stores a plurality of contents therein, and searching for a desired content from the plurality of contents. As described above, since the information processing apparatus 10 and the server 30 are connected to each other via networks, the search unit 152 accesses the server 30 via the network, and upon receipt of a notification for notifying a successful completion of authentication, the search unit 152 searches for a desired content from the plurality of contents stored in the server 30 in accordance with user inputs.

Upon receipt of an access from the information processing apparatus 10, the server 30 performs authentication processing to determine whether the relevant information processing apparatus 10 has already been registered, or not. The determination as to whether the relevant information processing apparatus 10 has already been registered, or not, is made by the server 30 by causing the relevant information processing apparatus 10 to transmit a piece of user identification information relating to a user who owns the relevant information processing apparatus 10, a piece of device information for identifying a device, which is the relevant information processing apparatus 10 in this case, and the like, to the server 30. The authentication processing performed by the server 30 will be described below in detail.

A list of the plurality of contents stored in the server 30 may be indicated on a display apparatus (omitted from illustration) included in the information processing apparatus 10, and a content may be selected from among the listed contents displayed thereon in accordance with user inputs. The content resulting from searching performed by the search unit 152 is transmitted to the server 30 via the network.

The recognition unit 154 has a function of recognizing the reproduction apparatus 20 that is capable of reproducing a content. As described above, a plurality of the reproduction apparatuses 20 are connected to the information processing apparatus 10 via the network 50 inside a house, such as a LAN. The recognition unit 154 detects whether any one of the reproduction apparatuses 20, which is connected to the information processing apparatus 10 via the network 50, further, is capable of transmitting and receiving data to/from the information processing apparatus 10 via the network 50, and further, is connected to the server 30 via the network 40, exists, or not.

The instruction unit 156 has a function of instructing the reproduction apparatus 20 to reproduce the content resulting from searching performed by the search unit 152. The instruction unit 156 instructs the reproduction apparatus 20 having been recognized by the recognition unit 154 to reproduce the content. In the case where a plurality of the reproduction apparatuses 20 are recognized by the recognition unit 154, one of the plurality of reproduction apparatuses 20 may be selected in accordance with user operations, and may be instructed to reproduce the content. Further, one of the plurality of reproduction apparatuses 20 having been recognized, which is located at the shortest distance from the information processing apparatus 10, may be selected.

Further, in this embodiment, the recognition unit 154 recognizes one of the reproduction apparatuses 20, which is connected to the server 30 via the network 40, and instructs the recognized reproduction apparatus 20 to reproduce a content; however, the recognition unit 154 may instruct one of the reproduction apparatuses 20, which is not powered on, or one of the reproduction apparatuses 20, which is not connected to the server 30, to reproduce a content. In this case, the information processing apparatus 10 may instruct the reproduction apparatus 20 to reproduce a content after directly causing a power supply to the reproduction apparatus 20 to turn on, or instructing the reproduction apparatus 20 to establish a connection to the server 30. The instruction unit 156 may instruct the reproduction apparatus 20 to perform reproduction of a content, and the like, via the network 50 or by using an infrared communication link or a short distance wireless communication link.

Upon receipt of an instruction of reproducing a content, which has been issued by the instruction unit 156, the reproduction apparatus 20 accesses the server 30, and requests the server 30 to reproduce the content. Upon receipt of the request for reproduction of the content, the server 30 performs authentication to determine whether the requesting reproduction apparatus 20 has already been registered, or not. Further, if it is determined that the requesting reproduction apparatus 20 has already been registered, the desired content is delivered to the requesting reproduction apparatus 20. The reproduction apparatus 20 may be provided with a DRM function and a decoding function. In this case, upon receipt of the desired content from the server 30, the reproduction apparatus 20 removes the DRM and performs decoding of the desired content, and then, reproduces the content.

A content delivered from the server 30 to the reproduction apparatus 20 may be delivered by using a streaming delivery method or a downloading method. Further, in the case where the reproduction apparatus 20 is configured by a mainframe portion thereof and a display portion thereof which are separately installed, handling may be performed so that the mainframe portion and the display portion of the reproduction apparatus 20 are connected to each other via an interface conforming to the high-definition multimedia interface (HDMI) standard and the like, and therevia, the mainframe portion of the reproduction apparatus 20 transmits the decoded content to the display portion thereof, and causes the display portion thereof to output the decoded content.

Further, a storage apparatus, such as a HDD, which does not have a DRM processing function and a display function, and a reproduction apparatus including a display therein may be combined as the reproduction apparatus 20. In this case, the instruction unit 156 instructs the storage apparatus to perform downloading of a content. The storage apparatus accesses a URL, which is provided by the information processing apparatus 10, and performs downloading of the content. Subsequently, the instruction unit 156 instructs the reproduction apparatus connected to the storage apparatus to reproduce the content. The content having been downloaded to the storage apparatus is delivered to the reproduction apparatus via a network. Further, in the reproduction apparatus, DRM removal processing on the delivered content and decompression processing on digital-compressed signals are performed, and then, the content is displayed on the display included in the reproduction apparatus.

Further, it is also possible to use the information processing apparatus 10 as a set top box by attaching the information processing apparatus 10 to a storage apparatus functioning as a cradle, and the like. In this case, in the same manner as described above, the instruction unit 156 of the information processing apparatus 10 instructs the storage apparatus to perform downloading of a content. The storage apparatus accesses a URL, which is provided by the information processing apparatus 10, and performs downloading of the content. Subsequently, in order to reproduce the content having been downloaded to the storage apparatus, the storage apparatus outputs the content to the information processing apparatus 10. Further, in the reproduction apparatus 10, DRM removal processing and decoding processing on the content is performed, and subsequently, reproduction of the content is started. The content having been reproduced by the information processing apparatus 10 is outputted to the display included in the reproduction apparatus 20, which is connected to the information processing apparatus 10 via an output interface conforming to the HDMI standard and the like.

The acquisition unit 160 has a function of acquiring reproduction information relating to a content having been reproduced by the reproduction apparatus 20. The reproduction information relating to a content having been reproduced by the reproduction apparatus 20 includes a reproduction start point associated with the content having been reproduced by the reproduction apparatus 20. As described above, in accordance with an instruction issued by the information processing apparatus 10, reproduction of a content is started by the reproduction apparatus 20. Further, it is assumed that the reproduction of the content has reached an intermediate point of the content, and simultaneously, watching and listening thereof is halted. In this case, a piece of information relating to the intermediate point of the content, until which reproduction thereof was completed, is the reproduction start point. In the reproduction apparatus 20, when the reproduction of the content has reached an intermediate point of the content, and simultaneously, watching and listening thereof is halted, the reproduction start point thereof is transmitted to the server 30.

When the information processing apparatus 10 attempts to resume watching and listening of a content from an intermediate point thereof, until which watching and listening thereof was previously completed by using the reproduction apparatus 20, or instructs the reproduction apparatus 20 to allow users to resume watching and listening of the content from the intermediate point thereof, the information processing apparatus 10 acquires information relating to reproduction start information, in addition to information relating to the content, from the server 30.

The reproduction unit 158 has a function of reproducing contents on the basis of reproduction information having been acquired by the acquisition unit 160. As described above, in the case where a reproduction start point of a content has been acquired as a piece of reproduction information, the reproduction unit 158 reproduces the content from the reproduction start point. Further, in the case where a content is delivered by using a streaming delivery method, the streaming delivery is started from the reproduction start point. Further, in the case where a content is delivered by using a downloading method, the content having been downloaded is reproduced from the reproduction start point.

The server 30 is configured to include a management file 301 and a content file 302. In the management file 301, information relating to authentication performed to determinate whether individual devices connected to the server 30 have already been registered, or not, is stored. Device information stored in the management file 301, which is used when authentication of individual devices are performed, will be described below with reference to FIG. 4. FIG. 4 is a diagram used for explanation of device information 310 stored in the management file 301.

As shown in FIG. 4, in the device information 310 included in the management file 301, for example, a device number (device No.), a serial number (serial No.), a Mac address and a product name of each of a plurality of devices connected to the server 30 are stored. The server 30 performs authentication to determine whether individual devices have already been registered, or not, on the basis of the device information 310 and the identification information for identifying users.

Further, the management file 301 may store therein the device information 310, as well as the above-described reproduction start points associated the device information 310. When delivering a content stored in the content file 302, the server 30 performs authentication of a device, which is a delivery destination of the content, on the basis of the user identification information and the device information stored in the management file 301. Furthermore, when, as a result of a reference to the management file 301, it is determined that a content to be delivered is associated with a piece of information relating to a reproduction start point, a portion of the content, starting from reproduction start point of the content, is delivered, or the piece of information relating to the reproduction start point is transmitted to a device that is a delivery destination of the content.

[4-2] Details of Content Reproduction Processing in Content Reproduction System

Figure 5:
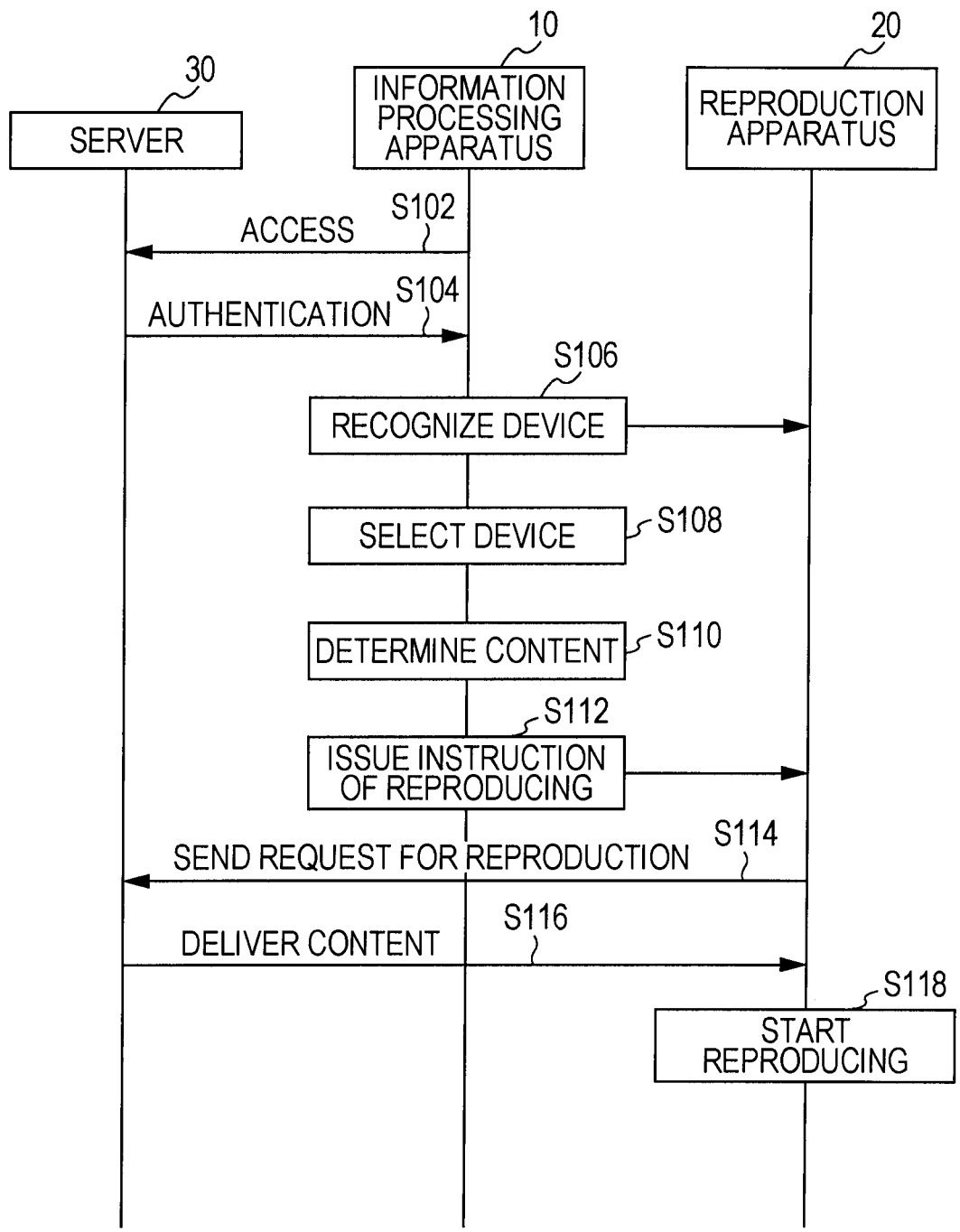
FIG. 5 is a timing chart illustrating details of content reproduction processing according to a first embodiment of the present invention.
Figure 6:
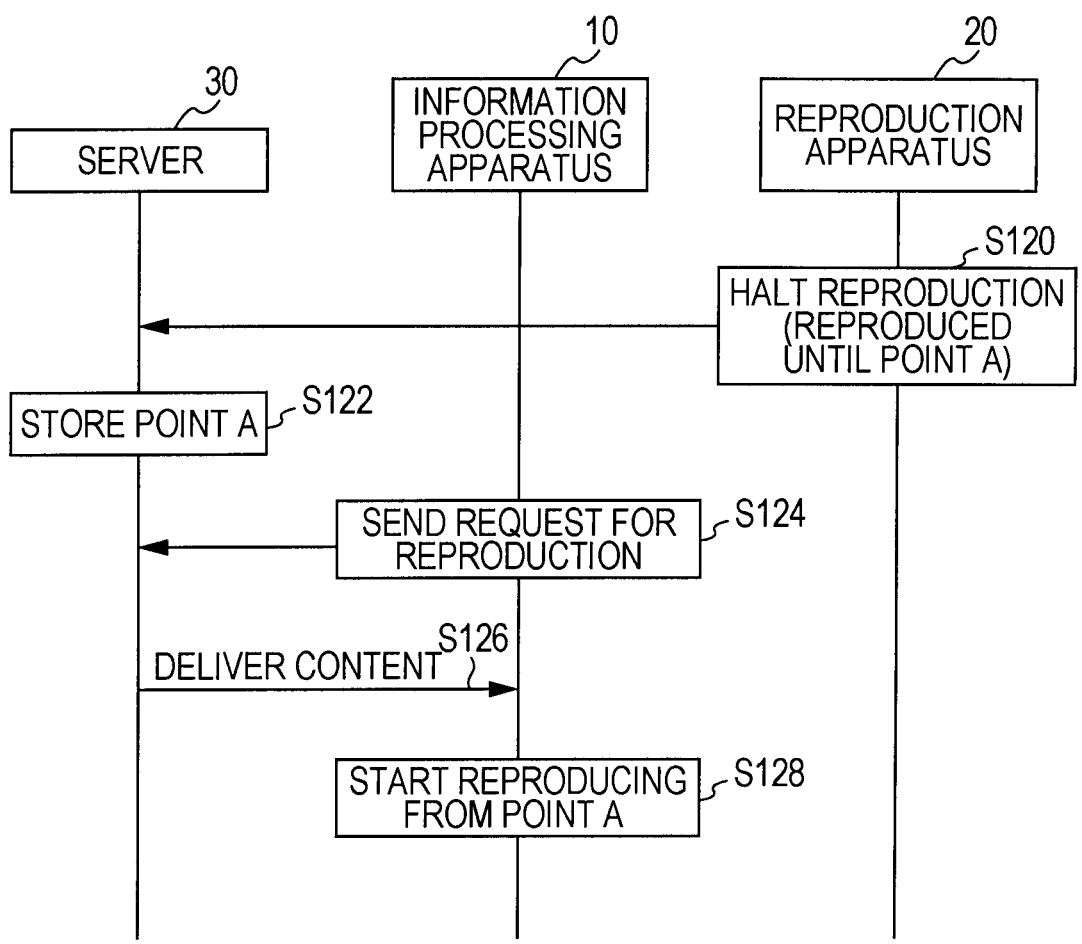
FIG. 6 is a timing chart illustrating details of content reproduction processing according to a first embodiment of the present invention.
Figure 7:
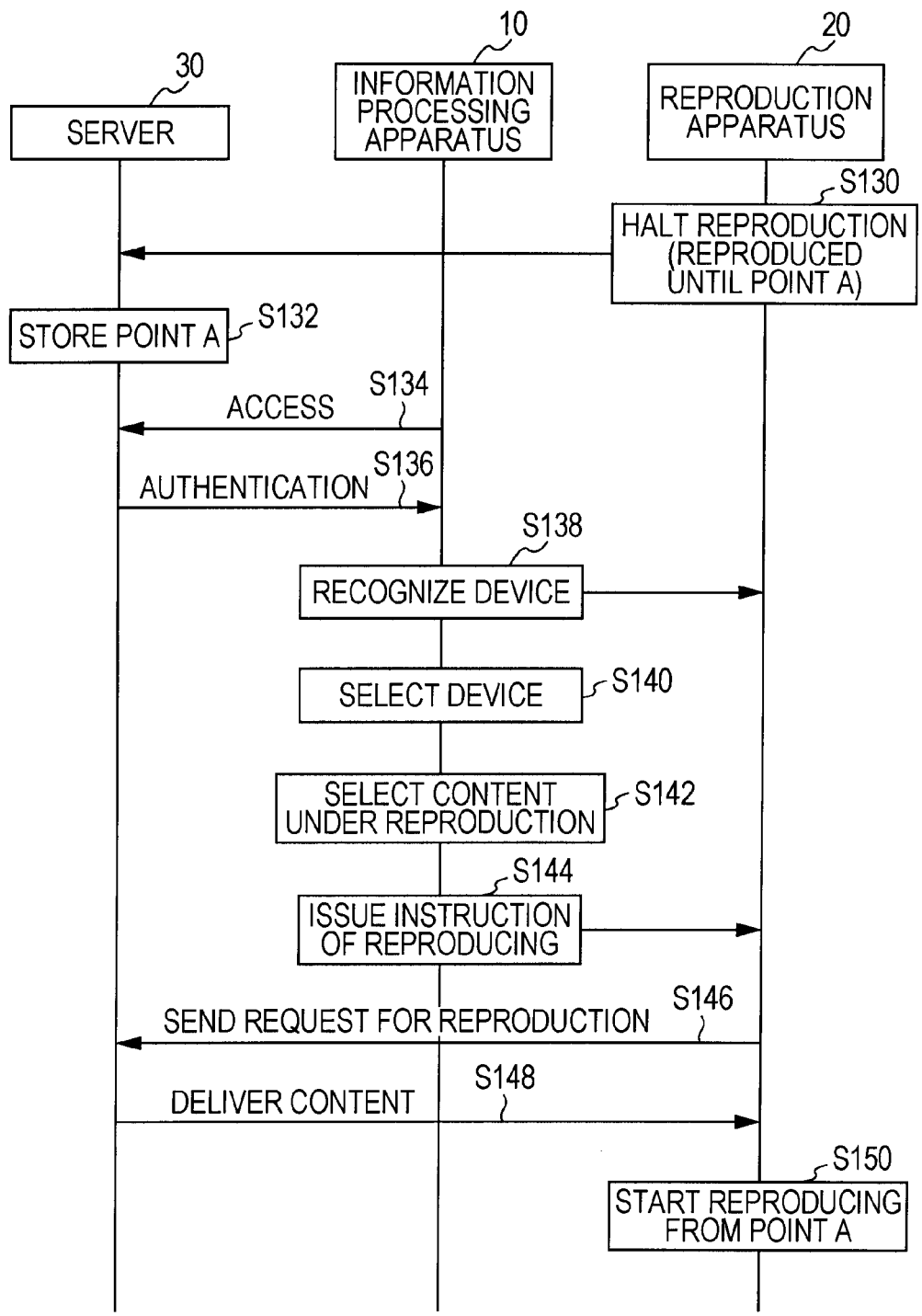
FIG. 7 is a timing chart illustrating details of content reproduction processing according to a first embodiment of the present invention.

Hereinbefore, a function configuration of the content reproduction system 1 has been described. Next, details of content reproduction processing according to this embodiment will be described below with reference to FIGS. 5 to 7. FIGS. 5 to 7 are timing charts illustrating details of content reproduction processing. As shown in FIG. 5, firstly, the information processing apparatus 10 accesses the server (S102), and requests the server 30 to perform authentication to confirm that the information processing apparatus 10 has already been registered (S104).

As described above, the authentication of the information processing apparatus 10 is performed in step S104 on the basis of a piece of user identification information relating to a user who owns the information processing apparatus 10 and a piece of device information relating to the information processing apparatus 10. That is, when accessing the server 30 in step S102, the information processing apparatus 10 transmits a piece of user identification information and a piece of device information relating to the information processing apparatus 10 itself to the server 30.

The server 30 confirms whether the piece of user identification information and the piece of device information having been transmitted from the information processing apparatus 10 are stored in the server 30, or not. Further, if it is confirmed that the piece of user identification information and the piece of device information are stored in the server 30, the server 30 authenticates that the information processing apparatus 10 is a device that has already been registered in the server 30. In this embodiment, the user identification information and the device information are information used for authentication of individual devices; however, the information relating to authentication of individual devices is not limited to the above-described information provided in this embodiment, but may be any kinds of information, from which users and devices can be identified.

Further, the information processing apparatus 10 recognizes devices that are connected to a network inside a house, or the like (S106). In step S106, it is recognized whether any devices, such as the reproduction apparatuses, each of which is capable of reproducing a content and is controllable from the information processing apparatus 10, are connected to the network, or not. In step S106, if a plurality of the reproduction apparatuses 20 are recognized, one of the reproduction apparatuses 20, which is allowed to reproduce the content, is selected from among the plurality of the reproduction apparatuses 20 (S108). The reproduction apparatus 20 to be selected in step S108 may be the reproduction apparatus 20 located at the shortest distance from the information processing apparatus 10, or may be the reproduction apparatus 20 that is determined in accordance with user operations.

Next, the information processing apparatus 10 determines a content to be reproduced from among a plurality of contents stored in the server 30 (S110). Further, the information processing apparatus 10 instructs the reproduction apparatus 20 to reproduce the content having been determined in step S110 (S112). As described above, the instruction of requesting the reproduction apparatus 20 to reproduce the content, the instruction being issued by the information processing apparatus 10 in step S112, is transmitted via a network inside a house, or via an infrared data communication link or a short distance wireless communication link.

The reproduction apparatus 20, having been instructed to reproduce the content in step S112, accesses the server 30 to request reproduction of the content to the server 30 (S114). The server 30, having been requested by the reproduction apparatus 20 to reproduce the content in step S114, confirms that the requesting reproduction apparatus 20 has already been registered, and subsequently, starts delivery of the content to the requesting reproduction apparatus 20 (S116). The reproduction apparatus 20, to which the content has been delivered by the server 30 in step S116, starts delivery of the content (S118). Such a method as described above allows users to perform operations, such as an operation of searching for a content, by using the information processing apparatus 10, which is located close by the user, further, causes the reproduction apparatus 20 including therein a large display to reproduce the content, thus, enables enhancement of operationality, and as a result, enables users to perform various kinds of operations without interrupting reproduction of a content, performed in the reproduction apparatus 20.

Next, content reproduction processing starting from an intermediate point of a content, until which watching and listening thereof was previously completed, will be described below with reference to FIGS. 6 and 7. FIG. 6 is a timing chart illustrating content reproduction processing performed by the information processing apparatus 10, starting from an intermediate point of a content, until which watching and listening thereof was previously completed. FIG. 6 is a timing chart used for explanation of content reproduction processing performed in the case where a content is delivered by using a streaming delivery method. As shown in FIG. 6, it is assumed that, in step S118 described above, reproduction of a content performed by the reproduction apparatus 20 has reached an intermediate point of the content, and simultaneously, the reproduction thereof is halted (S120). It is assumed that, in step S120, reproduction of a content has been completed until, for example, a point A of the content.

When, in step S120, reproduction of a content has reached the point A, and simultaneously, the reproduction of the content is halted, it is notified to the server 30 that, in the reproduction apparatus 20, reproduction of the content has been completed until the point A thereof. The server 30 stores the point A in the management file 301 as a piece of reproduction start information, in addition to a piece of device information (S122).

Subsequently, reproduction of the content having been delivered in step S116 is requested by the information processing apparatus 10 (S124). The server 30, having been requested to reproduce the content in step S124, confirms that the information apparatus 10 has already been registered, and starts delivery of the content to the information processing apparatus 10 (S126). In step S126, the server 30 performs a streaming delivery of the content from the point A thereof on the basis of the piece of reproduction start point having been stored in step S122. Further, the information processing apparatus 10 reproduces the content, which has been delivered in step S126, from the point A thereof (S128).

In step S128, reproduction of the content from an initial point thereof or reproduction of the content from the point A thereof may be selected in accordance with user operations. Further, in the case where a plurality of reproduction start points are included in the reproduction start information, a reproduction start point may be selected from among the plurality of reproduction start points.

Further, the reproduction start information may be set in accordance with user operations. For example, handling may be performed so that the reproduction start information is set to a point prior to or a point subsequent to a point at which watching and listening of a content was actually halted, and subsequently, the reproduction start information having been set is notified to the server 30. Such a method, which allows a device to start reproduction of a content on the basis of reproduction start information that was created by a different device, with which reproduction of the content was previously completed until an intermediate point thereof, enables users to, without performing searching to find out until which point reproduction of the content was previously completed, perform watching and listening of the content from the intermediate point, at which reproduction thereof was previously halted.

Next, content reproduction processing performed by the reproduction apparatus 20, starting from an intermediate point of a content, until which watching and listening thereof was previously completed, will be described below with reference to FIG. 7. As shown in FIG. 7, it is assumed that, after reproduction of a content was started by the reproduction apparatus 20 in step S118 described above, the reproduction has been halted at an intermediate point (a point A) of the content (S130).

When reproduction of the content has been halted at the point A thereof in step S120, it is notified to the server 30 that, by the reproduction apparatus 20, reproduction of the content has been completed until the point A. The server 30 stores the point A in the management file 301 as a piece of reproduction start information, in addition to a piece of device information (S132).

Subsequently, the information processing apparatus 10 accesses the server 30 (S134), and requests the server 30 to perform authentication to determine that the information processing apparatus 10 has already been registered (S136). Further, the information processing apparatus 10 recognizes devices which are connected to a network and the like inside a house (S138). In step S138, if a plurality of the reproduction apparatuses 20 are recognized, one of the reproduction apparatuses 20, which is allowed to reproduce the content, is selected from among the plurality of the reproduction apparatuses 20 (S140). The reproduction apparatus 20, which was selected in step S140, may be the relevant reproduction apparatus 20 that previously halted reproduction of the content at an intermediate point thereof, or may be the reproduction apparatus 20 different from the relevant reproduction apparatus 20.

Next, the information processing apparatus 10 selects a content, for which reproduction was halted at an intermediate point of the content in step S130 (S142). Further, the information processing apparatus 10 instructs the reproduction apparatus 20 to reproduce the content having been selected in step S142 (S144). The reproduction apparatus 20, which was instructed to reproduce the content in step S144, accesses the server 30, and requests the server 30 to reproduce the content (S146).

The server 30, which was requested to reproduce the content in step S146, confirms that the reproduction apparatus 20 is a device that has already been registered, and starts delivery of the content to the reproduction apparatus 20 (S148). In step S148, the server 30 performs a streaming delivery of the content from the point A thereof on the basis of the reproduction start information, which was stored in step S132. Further, the reproduction apparatus 20 reproduces the content, which was delivered in Step S148, from the point A thereof (S150). Hereinbefore, details of content reproduction processing has been described.

[5] Second Embodiment

Hereinbefore, a first embodiment has been described. Next, a second embodiment will be described below. A content reproduction system 1' according to this second embodiment has substantially the same configuration as the reproducing apparatus 1 according to the first embodiment, and therefore, functions different from those of the first embodiment will be described particularly in detail. This second embodiment has a function different from those of the first embodiment, the function being that, when a content is delivered from the server 30, in accordance with a connection condition and a performance of each of devices installed at a destination of the delivery, a certain kind of file, which is appropriate to reproduction of the content performed by a device, is transmitted so that, by using the device, users can watch and listen to the content.

[5-1] Function Configuration of Information Processing Apparatus

Figure 8:
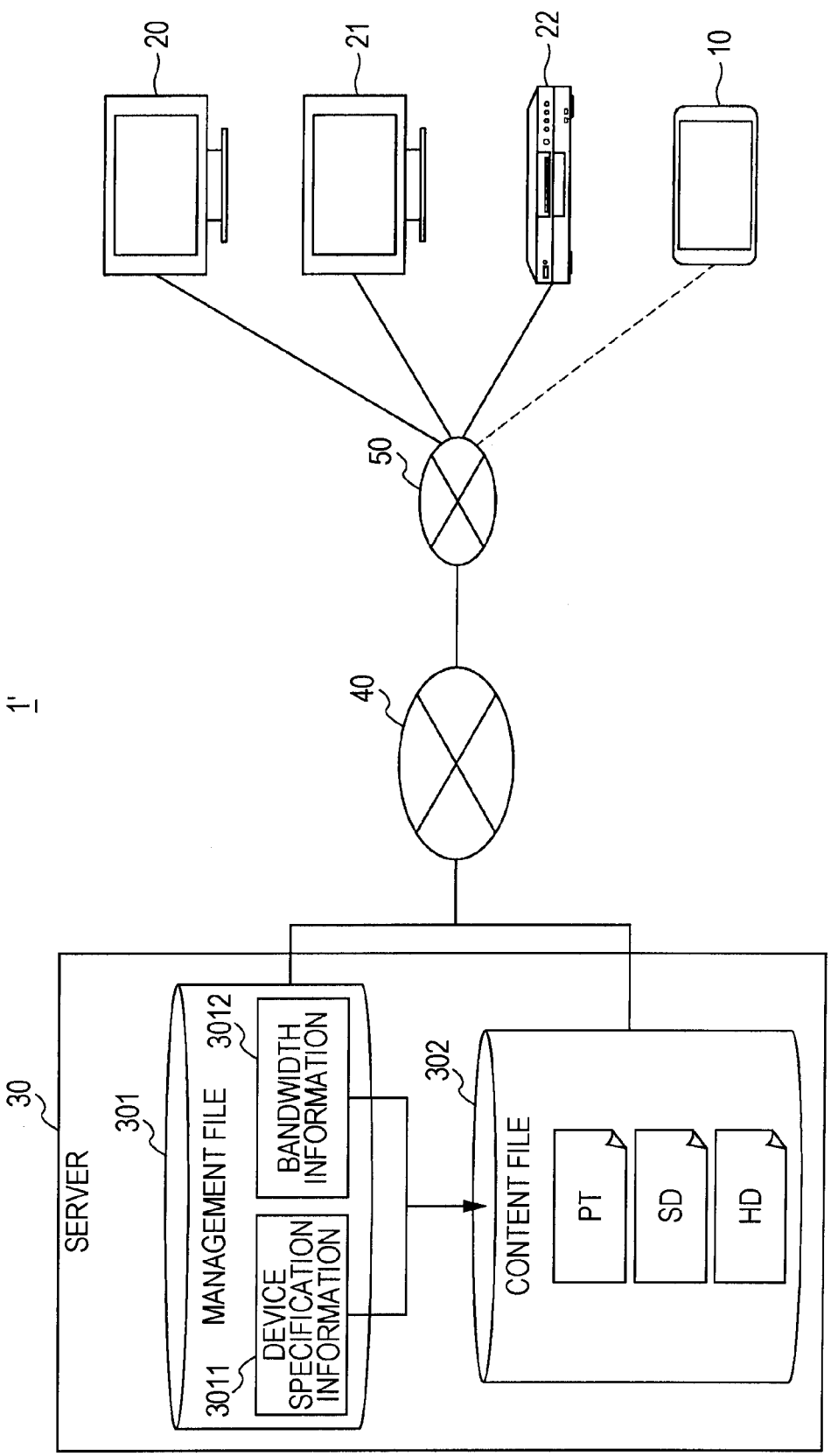
FIG. 8 is a block diagram illustrating an outline and a configuration of a content reproduction system according to a second embodiment of the present invention.

Firstly, an outline and functions of a content reproduction system 1' according to this embodiment will be described below with reference to FIG. 8. Hereinafter, functions different from those of the first embodiment will be described particularly in detail. The server 30 according to this embodiment is configured to include the management file 301 and the content file 302 just like the case of the first embodiment. The management file 301 stores therein user identification information and device information so that these two kinds of information can be associated with each other just like the case of the management file 301 according to the first embodiment.

Further, in the management file 301, pieces of specification information 3011 corresponding to individual devices, as well as pieces of bandwidth information 3012 corresponding to individual devices under the condition in which the individual devices are connected to the server 30, are stored. The pieces of specification information 3011 corresponding to individual devices are stored in advance so as to correspond to respective device numbers thereof. Further, the pieces of bandwidth information 3012 are acquired by the corresponding information processing apparatus 10 or the corresponding reproducing apparatuses 20 when these apparatuses are connected to the server 30.

Further, in the content file 302, a plurality of contents are stored, and for each group of contents having the same substance, several kinds of contents, each kind being of a different size, are stored. For example, for a certain group of contents, three kinds of contents are stored in the content file 302, a first kind of contents (PT) including contents each being of a small image size, a second kind of contents (SD) including contents each being of a middle image size, a third kind of contents (HD) including contents each being of a large image size.

On the basis of the specification information 3011 and the bandwidth information 3012 relating to a certain device, which has requested the server 30 to deliver a content, the server 30 selects and delivers a content having a file size appropriate to the device. For example, as explained in the first embodiment, upon receipt of a request from the reproducing apparatus 20 for delivery of a content, the request having been transmitted under an instruction issued by the information processing apparatus 10, the server 30 acquires the specification information 3011 and the bandwidth information 3012, and on the basis thereof, selects a content having an optimum size to deliver the selected content to the requesting reproduction apparatus 20.

Here, file sizes of contents, which are stored in the server 30, will be described below with reference to FIG. 9. FIG. 9 is a diagram used for explanation of file sizes of contents stored in the server 30. As shown in FIG. 9, for example, for each group of contents having the same substance, three kinds of files, each kind being of a different size, are stored in the server 30. For example, for a certain group of contents (a profile) 321, three kinds of contents, which are denoted by PT, SD and HD, are stored. For example, the PT includes low-resolution files, each being of an image size appropriate to a terminal having a small display, such as a mobile terminal.

Further, to each of the three kinds of files, an average bit rate (Avg Bit rate) 324, a peak bit rate (Peak Bit rate) 325 and the like are set. In accordance with a connection condition of each device having been connected to the server 30, the server 30 selects an HD file in the case where a communication speed is relative high, while the server selects a PT file in the case where a communication speed is relative low. Such a method as described above enables preventing of occurrences of a situation, in which it is difficult for a device connected to the server 30 to reproduce a content file having been delivered from the server 30 owing to a connection circumstance and/or a performance of the device. Furthermore, such a method as described above makes it possible for a user to, without confirming a connection condition and a performance of a device which the user desires for reproduction of a content, to obtain a delivered file having an optimum size, and thus, enables enhancement of operations performed by users.

[5-2] Details of Content Reproduction Processing in Content Reproduction System

Figure 10:
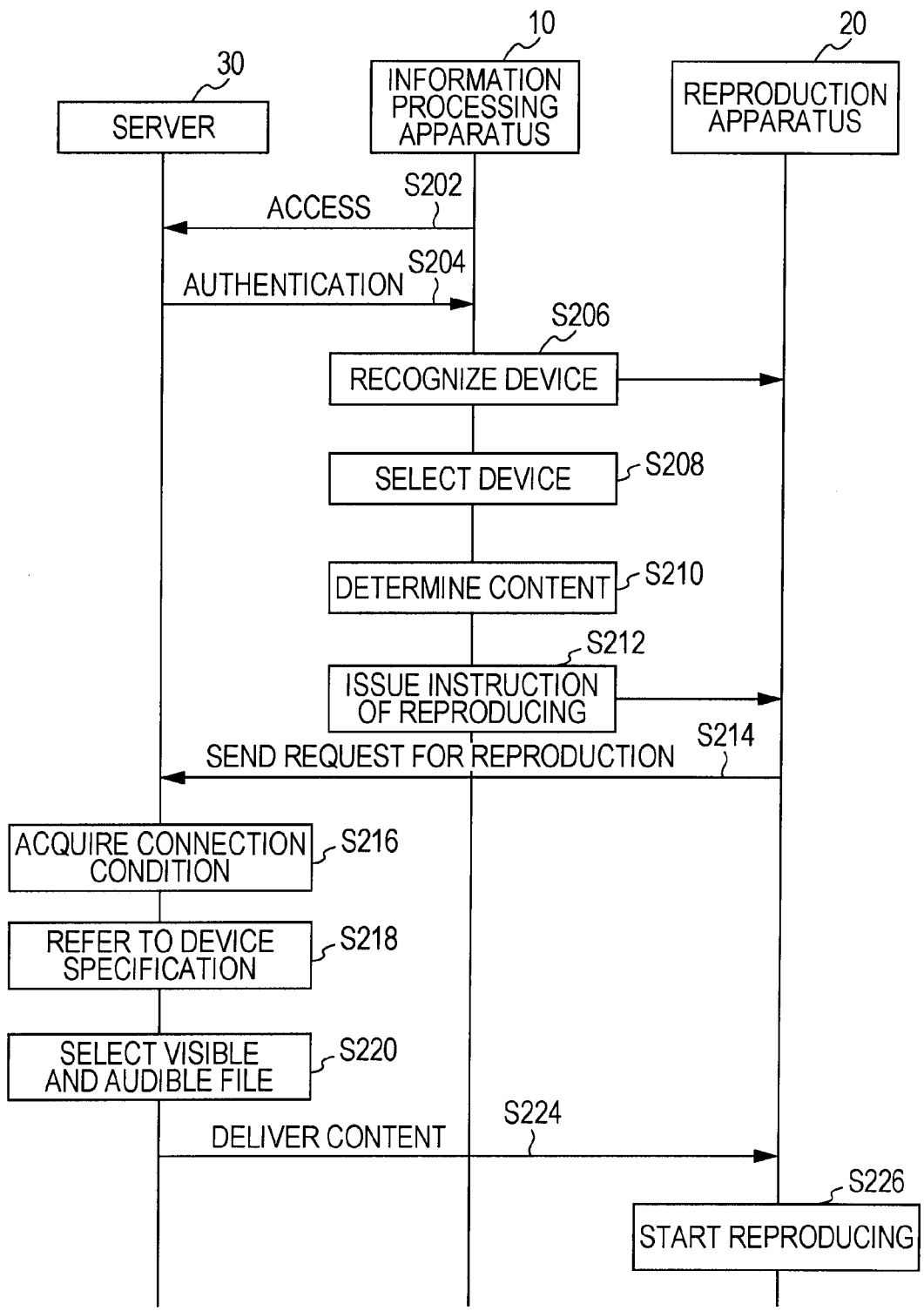
FIG. 10 is a timing chart illustrating details of content reproduction processing according to a second embodiment of the present invention.

Hereinbefore, an outline and a configuration of the content reproduction system 1' has been described. Next, content reproduction processing according to this embodiment will be described below with reference to FIGS. 10 and 11. FIGS. 10 and 11 are timing charts illustrating content reproduction processing. Hereinafter, processes different from those of the first embodiment will be described particularly in detail.

As shown in FIG. 10, firstly, the information processing apparatus 10 accesses the server 30 (S202), and allows the server 30 to perform authentication to confirm that the information processing apparatus 10 has already been registered (S204). The authentication of devices performed in step S204 is the same as that of the first embodiment, and therefore, is skipped from explanation in detail.

Further, the information processing apparatus 10 recognizes devices connected to a network inside a house, and the like (S206), and selects one of the reproduction apparatus 20 used for reproducing a content from among the recognized devices. (S208). Further, the information processing apparatus 10 determines a content to be reproduced from among a plurality of contents stored in the server 30 (S210), and instructs the selected reproduction apparatus 20 to reproduce the content (S212).

The reproducing apparatus 20, which was instructed to reproduce the content in step S212, accesses the server 30 to request the server 30 to reproduce the content (S214). The server 30, which was requested by the reproduction apparatus 20 to reproduce the content in step S214, confirms that the reproduction apparatus 20 has already been registered, and further, acquires a connection condition of the reproduction apparatus 20 (S216). Further, the server 30 refers to a piece of performance information (a piece of device specification information) relating to the reproduction apparatus 20, which is stored in the management file 301 of the server 30 (S218).

Further, the server 30 selects a file, which users can watch and listen to by using the reproduction apparatus 20, on the basis of the connection condition of the reproduction apparatus 20, which was acquired in step S216, and the device specification information relating to the reproduction apparatus 20 (S220). The server 30 delivers the file, which was selected in step S220, to the reproduction apparatus 20 (step S224). The reproduction apparatus 20, to which the content was delivered by the server 30 in step S224, starts reproduction of the content (S226). In step S220, if a plurality of files, which users can watch and listen to by using the reproduction apparatus 20, exist, a file to be reproduced may be selected in accordance with user operations.

Next, content reproduction processing performed from an intermediate point, at which watching and listening thereof was previously halted, will be described below with reference to FIG. 11. As shown in FIG. 11, it is assumed that, after reproduction of a content was started by the reproduction apparatus 20 in step S226 described above, the reproduction thereof is halted at an intermediate point (a point A) of the content (S230). The server 30 stores the point A in the management file 301 as a piece of reproduction start information, in addition to a piece of device information (S232).

Subsequently, a request for reproduction the content, which was delivered in step S224, is transmitted from the information processing apparatus 10 to the server 30 (S234). The server 30, which was requested to reproduce the content in step S224, confirms that the information processing apparatus 10 has already been registered, and further, acquires a connection condition of the information processing apparatus 10 (S236). Further, the server 30 refers to performance information (device specification information) relating to the information apparatus 10, which is stored in the management file 301 of the server 30 (S238).

Further, the server 30 selects a file, which users can watch and listen to by using the reproduction apparatus 20, on the basis of the connection condition of the reproduction apparatus 20, which was acquired in step S236, and the device specification information relating to the information processing apparatus 10 (S240). Since the information processing apparatus 10 is a small apparatus, such as a mobile terminal, the server 30 selects the "PT" file shown in FIG. 9. Further, the server 30 delivers the file of the "PT" size to the information processing apparatus 10 (S242). In step S242, the server 30 starts delivery of the content from the point A on the basis of the piece of reproduction start information having been stored in step S232. The information processing apparatus 10, which obtained a content having been delivered by the server 30 in step S242, starts reproduction of the content from the point A (S244).

Hereinbefore, content reproduction processing performed by the content reproduction apparatus 1' according to the second embodiment has been described. According to this method, in the case where a content, which was previously recorded by the reproduction apparatus 20 until an intermediate point of the content, is reproduced by the information processing apparatus 10 that is different from the reproduction apparatuses 20, it is possible for users to reproduce the content from the intermediate point thereof without being conscious of a maximum size of files each including the content, up to which each device is capable of reproducing the content. Such a method as described above enables preventing of occurrences of a situation in which, in the case where a content, which was previously reproduced by the reproduction apparatus 20 until an immediate point of the content, is reproduced by the information processing apparatus 10 continuously from the intermediate point thereof, it is difficult to reproduce the content owing to a connection circumstance and/or a performance with respect to related devices. Further, such a method as described above enables users to, in the case where reproduction of a content is resumed from an intermediate point of the content by using a device having a maximum size of files each including the content, up to which users can watch and listen to the content by using the device, the maximum size being different from that of a device that previously reproduced the content until the intermediate point thereof, watch and listen to the content without suffering from stress by delivering a file of an appropriate size so as not to trouble the users in confirmation of connection conditions and/or performances with respect to related device.

Hereinbefore, preferred embodiments according to the present invention have been described in detail with reference of accompanying drawings, but the present invention is not limited to the examples of the embodiments. It is obvious that those having normal knowledge in technical fields relating to the present invention can figure out various kinds of modification examples or alternation examples within the category of technical concepts set forth in the appended claims; however, it should be understood that, naturally, these modification examples or alternation examples are included in the technical scope of the present invention.

Further, it is not necessary to cause steps included in processes described in this specification document, which are executed by the information processing apparatus 10, the reproducing apparatus 20 and the server 30, to be time-series processed in accordance with an order described in each of flowcharts included in this specification document. That is, steps described in each of the flowcharts relating to the information processing apparatus 10, the reproducing apparatus 20 and the server 30 may include processes which are executed in parallel and/or processes which are executed individually (for example, parallel processing and/or object-based processing).

Furthermore, computer programs, which allow hardware elements, such as a CPU, a ROM, and a RAM, incorporated in the information processing apparatus 10, the reproduction apparatus 20 and the server 30 to fulfill the same functions as the above-described functions fulfilled by individual elements included in the information processing apparatus 10, the reproduction apparatus 20 and the server 30, are also can be created. Further, recording media storing the computer programs therein are also can be provided.

The present application contains subject matter related to that disclosed in Japanese Priority Patent Application JP 2009-239150 filed in the Japan Patent Office on Oct. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
 at least one reproduction unit;
 a processor-implemented search unit connected to said least one reproduction unit and configured to access a server storing a plurality of contents therein, and search for a desired content from among the plurality of contents;
 a processor-implemented recognition unit configured to recognize a selected reproduction apparatus, which is different from the reproduction unit and which selected reproduction apparatus is configured to reproduce the desired content stored in the server;
 a processor-implemented instruction unit configured to instruct the selected reproduction apparatus to reproduce from the server the desired content having been searched for by the search unit; and
 a processor-implemented acquisition unit configured to acquire reproduction information from the server relating to the desired content having been reproduced by the selected reproduction apparatus,
 wherein the instruction unit is further configured to cause the at least one reproduction unit to reproduce at least a portion of the desired content on the basis of the reproduction information having been acquired by the acquisition unit,
 wherein the reproduction information includes reproduction start information indicating a reproduction start point of the selected content where the reproduction of the selected content has been interrupted at the selected reproduction apparatus after having been partially reproduced by the selected reproduction apparatus,
 wherein the reproduction unit is configured to reproduce the content from the reproduction start point indicated by the reproduction start information that had been stored in the server, and
 wherein the reproduction start point is based, at least in part, on a method of content delivery.

2. The information processing apparatus according to claim 1, wherein the server is configured to, upon receipt of a request from the reproduction unit for reproduction of the content having been reproduced by the selected reproduction apparatus, deliver the content to the reproduction unit from the reproduction start point of the content on the basis of the reproduction start information.

3. The information processing apparatus according to claim 1, wherein the server is configured to, upon receipt of a request for reproduction of the content having been reproduced by the selected reproduction apparatus, transmit the reproduction start information in addition to the content.

4. The information processing apparatus according to claim 1, further including the selected reproduction apparatus and wherein the selected reproduction apparatus, having been instructed to reproduce the content by the instruction unit, requests the server to reproduce the content.

5. The information processing apparatus according to claim 1, wherein the server is configured to store the same content in different file sizes and, upon receipt of a request from the reproduction unit for reproduction of the selected content having been reproduced by the selected reproduction apparatus, deliver a selected content having a file size appropriate to a performance and a connection condition of the selected reproduction apparatus and reproduction unit, respectively.

6. An information processing method, comprising:
 using an apparatus that includes a reproductive unit to access a server storing a plurality of contents therein, and searching for a desired content from among the plurality of contents;
 recognizing a selected reproduction apparatus other than the reproductive unit, which selected reproduction apparatus is configured to reproduce the desired content stored in the server;

instructing the selected reproduction apparatus to reproduce from the server the desired content having been searched for;

sending a request from the selected reproduction apparatus to the server for the desired content;

sending the desired content from the server to the selected reproduction apparatus;

acquiring from the selected reproduction apparatus reproduction information relating to the desired content having been reproduced by the selected reproduction apparatus; and including in the reproduction information reproduction start information indicating a reproduction start point of the selected content where the reproduction of the selected content has been interrupted after having been partially reproduced in the reproduction apparatus; and reproducing at least a portion of the desired content in the reproductive unit from the reproduction start point indicated by the reproduction start information, wherein the reproduction start point is based, at least in part, on a method of content delivery.

7. A non-transient computer readable medium having a computer readable program code embodied therein, the computer readable program code adapted to cause a computer to function in combination with a plurality of reproduction devices including at least one reproduction apparatus and at least one reproduction unit, as an information processing apparatus comprising:

a processor-implemented search unit connected to the at least one reproduction unit and configured to access a server storing a plurality of contents therein, and search for a desired content from among the plurality of contents;

a processor-implemented recognition unit configured to recognize a selected reproduction apparatus, which is different from the reproduction unit and which selected reproduction apparatus is configured to reproduce the desired content stored in the server;

a processor-implemented instruction unit configured to instruct the selected reproduction apparatus to reproduce from the server the desired content having been searched for by the search unit; and a processor-implemented acquisition unit configured to acquire reproduction information from the server relating to the desired content having been reproduced by the selected reproduction apparatus, wherein the instruction unit is further configured to cause the at least one reproduction unit to reproduce at least a portion of the desired content on the basis of the reproduction information having been acquired by the acquisition unit, wherein the reproduction information includes reproduction start information indicating a reproduction start point of the selected content where the reproduction of the selected content has been interrupted at the selected reproduction apparatus after having been partially reproduced by the selected reproduction apparatus, wherein the reproduction unit is configured to reproduce the content from the reproduction start point indicated by the reproduction start information that had been stored in the server, and wherein the reproduction start point is based, at least in part, on a method of content delivery.

8. The method of claim 6 further comprising reproducing at least a portion of the desired content on the reproduction unit on the basis of the reproduction information having been acquired.

9. The non-transient computer readable medium of claim 7 in which the instruction unit is further configured to cause the at least one reproduction unit to reproduce at least a portion of the desired content on the basis of the reproduction information having been acquired by the acquisition unit.

10. An information processing apparatus, comprising:

at least one reproduction unit;

a processor-implemented search unit connected to said least one reproduction unit and configured to access a server storing a plurality of contents therein, and search for a desired content from among the plurality of contents;

a processor-implemented recognition unit configured to recognize a selected reproduction apparatus, which selected reproduction apparatus is different from the reproduction unit and which selected reproduction apparatus is configured to reproduce the desired content stored in the server;

a processor-implemented instruction unit configured to instruct the selected reproduction apparatus to reproduce from the server the desired content having been searched for by the search unit; and a processor-implemented acquisition unit configured to acquire reproduction information from the server relating to the desired content having been reproduced by the selected reproduction apparatus, wherein the reproduction information includes reproduction start information indicating a reproduction start point of the selected content where the reproduction of the selected content has been interrupted at the selected reproduction apparatus after having been partially reproduced by the selected reproduction apparatus, wherein the instruction unit is configured to cause the selected reproduction apparatus to reproduce the content from the reproduction start point indicated by the reproduction start information that had been stored in the server, and wherein the reproduction start point is based, at least in part, on a method of content delivery.

11. An information processing apparatus, comprising:

at least one reproduction unit;

a processor-implemented search unit connected to said least one reproduction unit and configured to access a server storing a plurality of contents therein, and search for a desired content from among the plurality of contents;

a processor-implemented recognition unit configured to recognize a selected reproduction apparatus, which selected reproduction apparatus is different from the reproduction unit and which selected reproduction apparatus is configured to reproduce the desired content stored in the server;

a processor-implemented instruction unit configured to instruct the selected reproduction apparatus to reproduce from the server the desired content having been searched for by the search unit; and a processor-implemented acquisition unit configured to acquire reproduction information from the server relating to the desired content having been reproduced by the selected reproduction apparatus, wherein the reproduction information includes reproduction start information indicating a reproduction start point of the selected content where the reproduction of the selected content has been interrupted at the selected reproduction apparatus after having been partially reproduced by the selected reproduction apparatus, wherein the instruction unit is configured to cause a reproduction apparatus other than the selected reproduction apparatus other than the reproductive unit to reproduce the content from the reproduction start point indicated by the reproduction start information that had been stored in the server, and wherein the reproduction start point is based, at least in part, on a method of content delivery.

12. An information processing method, comprising:

using an apparatus that includes a reproductive unit to access a server storing a plurality of contents therein, and searching for a desired content from among the plurality of contents;

recognizing a selected reproduction apparatus other than the reproductive unit, which selected reproduction apparatus is configured to reproduce the desired content stored in the server;

instructing the selected reproduction apparatus to reproduce from the server the desired content having been searched for;

sending a request from the selected reproduction apparatus to the server for the desired content;

sending the desired content form the server to the selected reproduction apparatus;

acquiring from the selected reproduction apparatus reproduction start information indicating a reproduction start point of the selected content where the reproduction of the selected content has been interrupted after having been partially reproduced in the reproduction apparatus; and reproducing at least a portion of the desired content in said selected reproduction apparatus from the reproduction start point indicated by the reproduction start information, wherein the reproduction start point is based, at least in part, on a method of content delivery.

13. An information processing method, comprising:

using an apparatus that includes a reproductive unit to access a server storing a plurality of contents therein, and searching for a desired content from among the plurality of contents;

recognizing a selected reproduction apparatus other than the reproductive unit, which selected reproduction apparatus is configured to reproduce the desired content stored in the server;

instructing the selected reproduction apparatus to reproduce from the server the desired content having been searched for;

sending a request from the selected reproduction apparatus to the server for the desired content;

sending the desired content form the server to the selected reproduction apparatus;

acquiring from the selected reproduction apparatus reproduction start information indicating a reproduction start point of the selected content where the reproduction of the selected content has been interrupted after having been partially reproduced in the reproduction apparatus;

reproducing at least a portion of the desired content in a reproduction apparatus other than said selected reproduction apparatus other than the reproductive unit from the reproduction start point indicated by the reproduction start information, and wherein the reproduction start point is based, at least in part, on a method of content delivery.

14. A non-transient computer readable medium having a computer readable program code embodied therein, the computer readable program code adapted to cause a computer to function in combination with a plurality of reproduction devices including at least one reproduction apparatus and at least one reproduction unit, as an information processing apparatus comprising:

a processor-implemented search unit connected to the at least one reproduction unit and configured to access a server storing a plurality of contents therein, and search for a desired content from among the plurality of contents;

a processor-implemented recognition unit configured to recognize a selected reproduction apparatus, which is different from the reproduction unit and which selected reproduction apparatus is configured to reproduce the desired content stored in the server;

a processor-implemented instruction unit configured to instruct the selected reproduction apparatus to reproduce from the server the desired content having been searched for by the search unit; and a processor-implemented acquisition unit configured to acquire reproduction information from the server relating to the desired content having been reproduced by the selected reproduction apparatus, wherein the reproduction information includes reproduction start information indicating a reproduction start point of the selected content where the reproduction of the selected content has been interrupted at the selected reproduction apparatus after having been partially reproduced by the selected reproduction apparatus, wherein the instruction unit is configured to cause the selected reproduction apparatus to reproduce the content from the reproduction start point indicated by the reproduction start information that had been stored in the server, and wherein the reproduction start point is based, at least in part, on a method of content delivery.

15. A non-transient computer readable medium having a computer readable program code embodied therein, the computer readable program code adapted to cause a computer to function in combination with a plurality of reproduction devices including at least one reproduction apparatus and at least one reproduction unit, as an information processing apparatus comprising:

a processor-implemented search unit connected to the at least one reproduction unit and configured to access a server storing a plurality of contents therein, and search for a desired content from among the plurality of contents;

a processor-implemented recognition unit configured to recognize a selected reproduction apparatus, which is different from the reproduction unit and which selected reproduction apparatus is configured to reproduce the desired content stored in the server;

a processor-implemented instruction unit configured to instruct the selected reproduction apparatus to reproduce from the server the desired content having been searched for by the search unit; and a processor-implemented acquisition unit configured to acquire reproduction information from the server relating to the desired content having been reproduced by the selected reproduction apparatus, wherein the reproduction information includes reproduction start information indicating a reproduction start point of the selected content where the reproduction of the selected content has been interrupted at the selected reproduction apparatus after having been partially reproduced by the selected reproduction apparatus, wherein the instruction unit is configured to cause a reproduction unit, other than the selected reproduction apparatus and other than the reproduction unit, to reproduce the content from the reproduction start point indicated by the reproduction start information that had been stored in the server, and wherein the reproduction start point is based, at least in part, on a method of content delivery.

* * * * *